United States Patent [19]
Beguin

[11] 3,845,491
[45] Oct. 29, 1974

[54] ERASABLE TRACE RECORDER

[76] Inventor: Rene Beguin, Chene-Bougeries, Geneva, Switzerland

[22] Filed: Mar. 13, 1973

[21] Appl. No.: 340,720

[30] Foreign Application Priority Data
Mar. 22, 1972 Switzerland.................... 4297/72

[52] U.S. Cl. ............................................. 346/21
[51] Int. Cl. ............................................ G01d 9/12
[58] Field of Search .................................. 346/21

[56] References Cited
UNITED STATES PATENTS
3,430,257  2/1969  Johnson............................. 346/21 X
3,588,907  6/1971  Luger................................ 346/21 X

*Primary Examiner*—Joseph W. Hartary
*Attorney, Agent, or Firm*—Kurt Kelman

[57] ABSTRACT

A trace recorder is disclosed in which the record carrier is formed by a web of hairy fabric and a recording element, replacing the convention styles, guides on to this web a filamentary indicator element which is retained on position on the web, to define a trace, by means of hook-like retaining hairs engaging the indicator element on the web, or by means of hook-like retaining hairs on the filament engaging a hairy surface of the web. The trace can be erased simply by pulling the indicator element off from the web.

2 Claims, 5 Drawing Figures

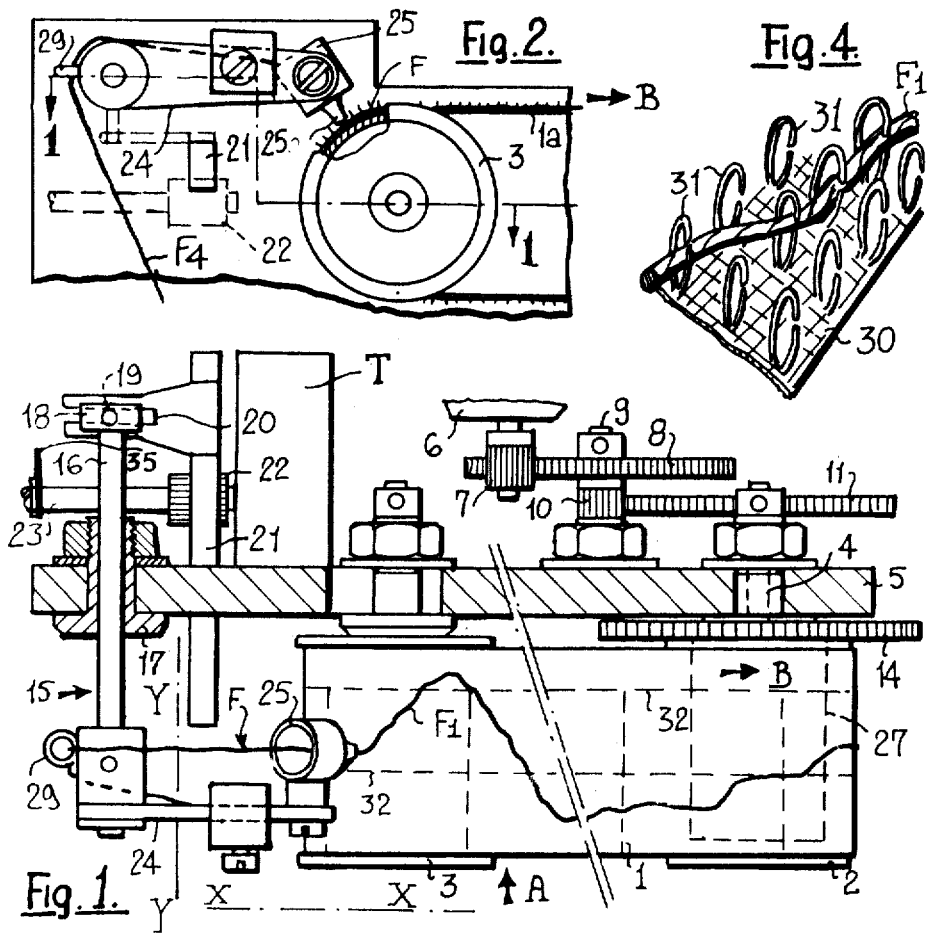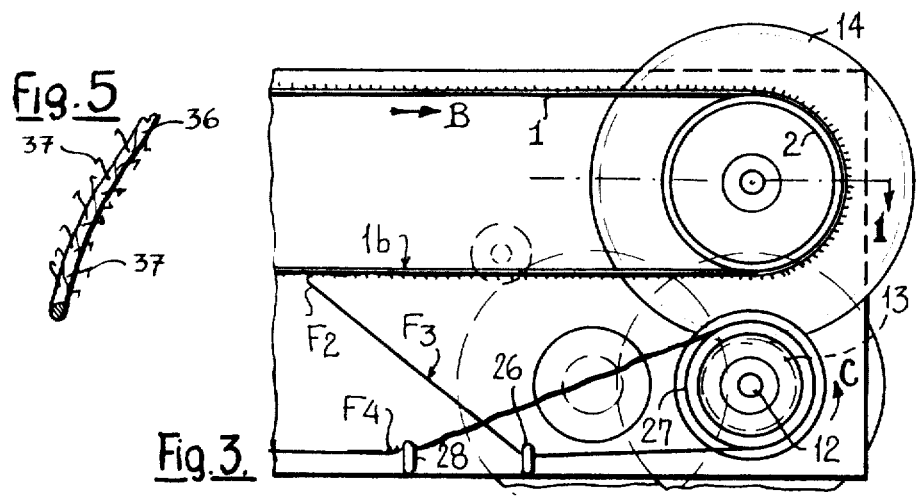

ERASABLE TRACE RECORDER

BACKGROUND OF THE INVENTION

This invention relates to a trace recorder, i.e. to a device for recording on a support a trace of a pointer or the like which moves relatively to the support. Such a trace recorder may be used in all kinds of applications of which one example is in a vehicle tachograph enabling a check to be made on the speed at which a vehicle passed through a zone.

There are many scientific and measuring appliances in which the position of a moving pointer indicates the instantaneous magnitude of a variable. To enable the trend of the variable to be studied or to enable the data to be retained for a time, it is conventional to record, in a trace recorder, a trace of the pointer movements on a support. Some known trace recorders use ink traces traced by pens; unfortunately, their operation is unreliable and servicing is difficult. Trace recorders are also known which use a stylus or beam of light to form the trace. In these cases special papers (pressure or light sensitive papers respectively), must be used which are relatively expensive and delicate.

It is an object of the invention to provide a trace recorder which is simple in construction and is reliable in operation.

It is another object of the invention to provide a trace recorder in which the trace can be erased and the trace support re-used indefinitely.

SUMMARY OF THE INVENTION

According to the invention there is provided a trace recorder comprising a record support providing a first surface,
a recording member,
means mounting the recording member and the record carrier for relative movement to allow the recording member to trace a path over said first surface,
a filamentary indicator element,
supply means for said filamentary indicator element, said recording member including guide means for said filamentary indicator element via which said indicator element passes from said supply means to said first surface of the record carrier, said filamentary indicator element and said first surface of the record support having mutual retaining means for retaining the indicator element on said first surface when applied thereto by said recording element, whereby the filamentary indicator element will be laid on said surface along the path of the recording member thereover to provide a record of said path, until the filamentary indicator element is pulled off from said first surface of said record support.

BRIEF DESCRIPTIN OF THE DRAWINGS

FIG. 1 is a plan view of the device, a trace recorder according to the invention, partly in section along the line 1—1 of FIGS. 2 and 3;

FIGS. 2 and 3 taken together form a view of the trace recorder in elevation in the direction indicated by the arrow A in FIG. 1, FIG. 2 showing the left-hand part of the recorder and FIG. 3 showing the right-hand part of the recorder;

FIG. 4 is a diagrammatic fragmentary prespective view to an enlarged scale of the surface of a record support of the recorder of FIG. 1, and FIG. 5 is a partial view to an enlarged scale of an alternative form of indicator filament.

DETAILED DESCRIPTION OF THE DRAWINGS AND THE INVENTION

The trace recorder shown comprises an endless record support web 1, supported by a drive roller 2 and a reversing roller mounted in a frame. Pulley 2 is mounted for rotation in a bearing 4 in a plate 5 forming part of the frame and is rotated by an electric motor 6 whose shaft has a pinion 7 meshing with a gear wheel 8 on a countershaft 9 rotatably mounted in the plate 5, a pinion 10 rigidly secured to shaft 9 meshing with a gear wheel 11 which is rigidly secured to a shaft 12 extending rotatably through plate 5, shaft 12 bearing a pinion 13 which meshes with a gear wheel 14 rigidly secured to roller 2. Motor 6 drives pulley 2 through this reduction train so that the top run 1a of web 1 moves in the various drawings in the direction indicated by arrows B.

Web 1 takes the form of a strip of a fabric which is hairy on its outside surface, for instance, the fabric which has hook-like retaining hairs and which is known under the trade mark "Velcro". This fabric, which is shown diagrammatically to an enlarged scale in FIG. 4, comprises a large number of slit loops 31 made of a relatively rigid fibre on a fabric backing 30.

The trace recorder comprises a movable recording member 15 whose trace will be recorded on the record support 1. Member 15 comprises a rod 16 slidable and rotatable in a guide bush 17 rigidly secured to a plate 5, and having its axis parallel with the axes of rollers 2 and 3.

Secured to the end of rod 16 on the side of plate 5 remote from rollers 2 and 3 is a head 18 having a finger 19 engaged in a fork 20 rigidly secured to a rod 21 slidable in an aperture in plate 5; parallel with rod 15. On its bottom surface rod 21 has a rack meshing with a pinion 22 rigidly secured to a shaft 23, for instance, the spindle bearing an indicating needle 35 of a vehicle speedometer. In other cases the shaft 23 could be the output element of some other indicating instrument such as a barometer or pressure gauge or voltmeter or the like.

As a result of rotation of pinion 22 in either sense, the indicating element 15 moves in the bush 17 along the axis Y—Y of FIG. 1.

Rod 16 bears at its end opposite head 18, an arm 24 having at its end remote from rod 16 a filament guide 25 adapted to deposit on the surface of the support web 1 a filamentary indicating element F which the unevennesses formed by the hairs of the fabric of web 1 retain on the tape in the as-deposited position. The deposited filament F1 (FIG. 1) therefore engages in the hooks formed by the slit loops in the manner visible in FIG. 4.

The deposited indicating element portion F1 therefore forms a trace recording the movements of the pointer 15 along the ordinate axis Y—Y in a diagram in which the abscissa axis X—X corresponds to the direction of movement of the tape 1. Marking lines 32 on the web 1 enable the diagram to be read. If required, scales can be provided on a transparent sheet or the like placed above the tape.

The indicating element F, which is in the form of an endless loop, is detached from the bottom run 1b of the tape at a place F2 by means, to be described hereinafter, for erasing and feeding the filament. The element F runs from the place F2, over a section F3 of its path to a guide 26, carried by plate 5 and thence to a capstan embodied by a roller 27 rigidly secured to the shaft 12. The filament makes several turns around the roller 27 before continuing over a section F4 of its path, which extends through a guide 28 carried by plate 5 and a guide 29 carried by rod 16, and is returned to the guide 25. The same loop of indicating filament is therefore used continuously. The guides 28 and 29 may be regarded as supply means supplying the filament to guide 25.

Roller 27 is rotated in the direction indicated by an arrow C (FIG. 3) to detach the filament from the web 1. However, roller 27 applies a positive pull to the filament over section F3 only when the turns of filament on the roller 27 are tight, a state occurring only when the filament in the section F4 downstream of the capstan is tensed slightly. The capstan therefore automatically feeds the guide 25 at a slight and substantially constant tension of the filament. The disengagement position F2 of the filament moves on the bottom run 1b of the web 1 according to the varying amount of filament actually used for the deposited sinuous trace F1. The peripheral velocity of the roller 27, which is proportional to the rate of advance of web 1, is high enough for the moving guide 25 to be fed at a high enough rate of filament movement to be able to deposit the filament substantially untensioned on the support even at its fastest and biggest movements. The reserve of filament therefore results from variation of the position of the detachment plate F2 but there is no accidental looseness of the filament and it is not tensioned excessively.

The guide 25 comprises a hollow guide member 25a in the form of a nozzle which engages between the hook like hairs on the web 1 and deposits the indicating filament F in the hairs of the web 1 in an exact position which the filament maintains until subsequently detached. The filament is introduced in this way over a convex part of the tape web 1, i.e., as the latter passes over roller 3, and in which part the hairs extend in divergent directions to facilitate introduction of the filament. Subsequently, the filament is clamped and tightened between the hairs 31 in the flat part of the web, the hairs closing up and retaining the tape tightly in its as-deposited position.

The trace recorder disclosed has the following advantages:

It is always ready for use; there is no need to first fit a fresh record carrier, or fill up with ink. The support web and the indicator filament, since they are continuously re-used, do not need replacement. If the device is knocked or squeezed, the flexible web, even though deformed, will usually keep the filament engaged in the retaining hairs, so that the web, which has a high tearing strength anyway, can readily be restored.

The filamentary indicator element may be a wire, or, in variants, the filamentary indicator element can be a cord or cable or chain or tape or the like.

The indicator element can be inter alia a hairy filament comprising, e.g., hook-like retaining hairs engageable with unevennesses or irregularities of the record support surface. A hairy filament of this kind can be seen in FIG. 5 where a filament 36 has hook-like hairs 37. In this case the web 1 can simply be an ordinary hairy fabric. In variants, the indicator element can be embodied by a filament having different kinds of surface or cross-sectional irregularities for improved engagement.

Although the record support surface is preferably in the form of fabric having retaining hairs in the form of slit loops as in the "Velcro" kind of product, other forms of support may be suitable. The tape 1 can be embodied inter alia by a strap having a large number of metal teeth with slightly curved ends or by a plastics strip having unevennesses or recessed parts adapted to retain the filamentary indicator element in its as-deposited position.

In a further variant, a low-cost indicator filament can be fed from a reserve which is periodically renewed, in which case the filament is not re-used after detachment from the support. Also, a very long support web which may or may not be looped on itself can be coiled in a magazine to give a longer trace.

The recording device described, although forming part of a tachograph, is of course of use in any other measuring or indicating instrument, and the movements of the moving element can be produced by any other drive means. In the case of a vehicle, the support-driving means can be a direct take-off from a moving element of the vehicle.

I claim:

1. A trace recorder comprising a record support providing an endless first surface, a recording member, a frame defining a recording station therein, means mounting said record support for movement in said frame to traverse said first surface of the record support in a first direction through said recording station, said mounting means for the record support allowing continuous recirculating movement of said first surface through said recording station, means mounting said recording member in said frame for movement through said recording station in a direction transverse to said first direction to trace a path over said first surface, an endless loop filamentary indicator element, supply means for said endless loop filamentary indicator element, said recording member including guide means for said endless loop filamentary indicator element via which said indicator element passes from said supply means to said first surface of the record support, said filamentary indicator element and first surface of the record support having mutual retaining means for retaining the indicator element of said first surface when applied thereto by said recording member, whereby the filamentary indicator element will be laid on said surface along the path of the recording member thereover to provide a record of said path until the filamentary indicator element is detached from said first surface of said record support, and means for detaching said indicator element from said first surface at a station spaced from said recording station and for supplying the detached indicator element to said supply means, said supply means being constituted by further guide means guiding the filamentary indicator element to the first mentioned guide means, said means for detaching said indicator element from said support and supplying it to said further guide means including a capstan for pulling said indicator element from said record support and for feeding the detached indicator element at a predetermined reduced tension to said further guide means, means rotatably punting the capstan in said frame and drive means for rotating the capstan, and said filamentary indicator element making at least one turn around said capstan.

2. A trace recorder comprising a record support consisting of a piece of hairy cloth providing an endless first surface having hook-like retaining hairs formed by splitloops of fibre, a recording member, a frame defining a recording station therein, means mounting said record support for movement in said frame to traverse said first surface of the record support in a first direction through said recording station, said mounting means for the record support allowing continuous recirculating movement of said first surface through said recording station, means mounting said recording member in said frame for movement through said recording station in a direction transverse to said first direction to trace a path over said first surface, an endless loop filamentary indicator element, supply means for said endless loop filamentary indicator element, said recording member including guide means for said endless loop filamentary indicator element via which said indicator element passes from said supply means to said first surface of the record support, said hook-like retaining hairs on said first surface catching the indicator element and retaining the latter thereon when applied thereto by said recording member, whereby the filamentary indicator element will be laid on said surface along the path of the recording member thereover to provide a record of said path until the filamentary indicator element is detached from said first surface of said record support, and means for detaching said indicator element from said first surface at a station spaced from said recording station and for supplying the detached indicator element to said supply means, said supply means being constituted by further guide means guiding the filamentary indicator element to the first mentioned guide means.

* * * * *